United States Patent Office 3,266,289
Patented August 16, 1966

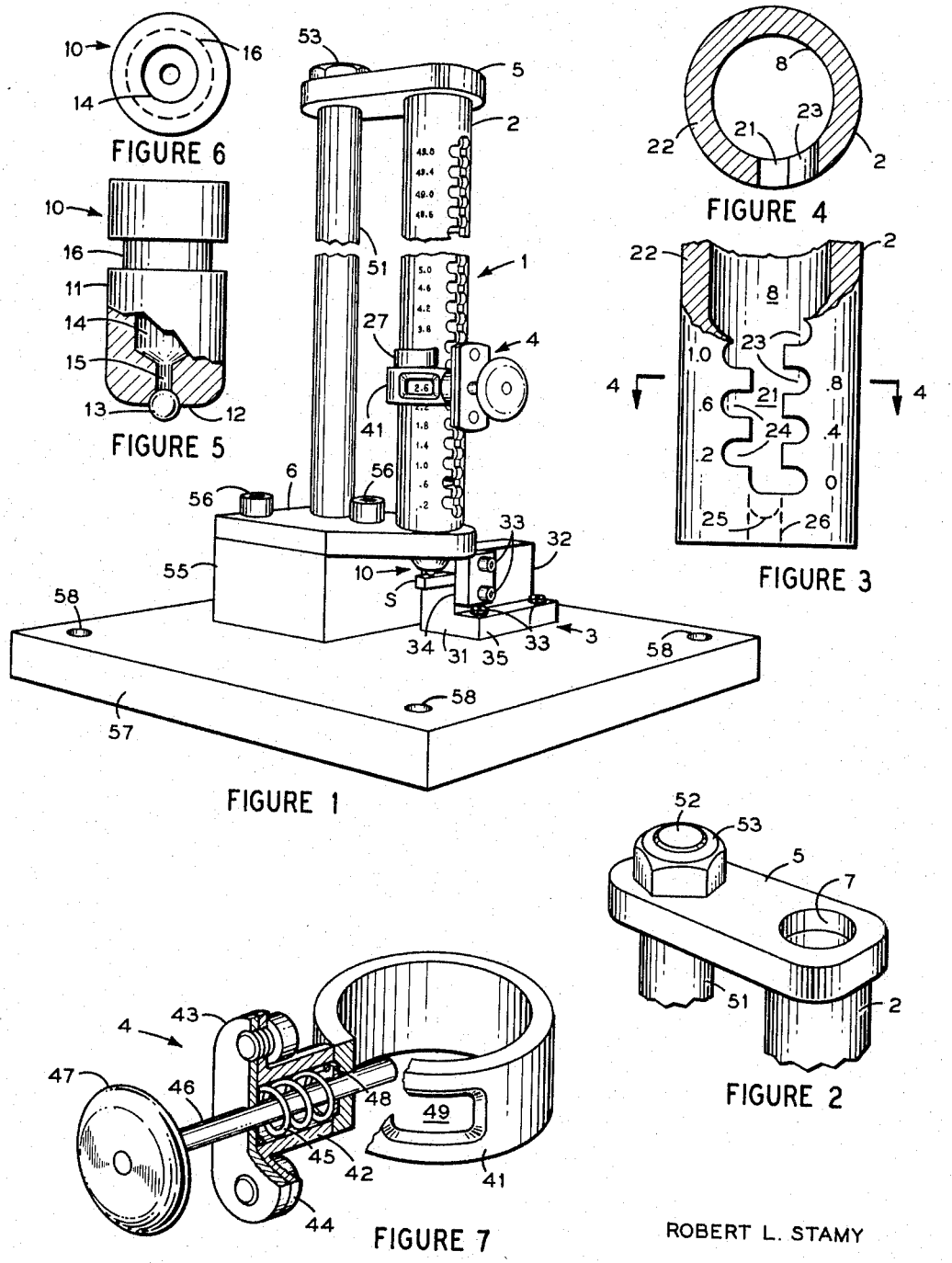

3,266,289
DROP HAMMER IMPACT TESTER
Robert L. Stamy, Houston, Tex., assignor to Hughes Tool Company, Houston, Tex., a corporation of Delaware
Filed Sept. 11, 1963, Ser. No. 308,111
2 Claims. (Cl. 73—12)

The present invention is in the field of laboratory or testing equipment used to determine the strength of materials under sudden stress, and particularly in the field of such equipment utilizing a falling mass or drop hammer to load specimens of such material.

Prior art devices such as the well known Charpy and Izod impact testers utilize a weight mounted pendulum fashion on the end of a pivoted lever, the weight being at the center of percussion of the pendulum and usually swinging from a zenithal starting position to rupture a specimen mounted at the nadir, as a simple beam in the Charpy machine or a cantilever beam in the Izod device. The strength of the specimen is determined by the energy required to break it, this energy being calculated as the difference between the initial energy of the weight and its energy after rupture, as measured by the arc through which it then swings. While such devices have been found useful for some materials, they are objectionable in testing specimens of dutile materials in that the specimens have to be notched before they can be broken.

They are also lacking in flexibility, as it is difficult to change the weight on the free end of the pendulum without changing the location of the center of percussion of the pendulum and thus introducing vibratory forces. If the standard specimens can not be broken, it is necessary either to use a different machine or to alter the specimens, either as to dimensions or by different notching. The latter alternatives are not completely acceptable, as the only real value of impact strength tests appears to lie in a comparison of energies required to break specimens of identical configuration. The first alternative, of course, has the obvious disadvantage of greater expense.

The present invention is an impact tester wherein a weight or drop hammer is released a predetermined distance above a specimen and is allowed to fall freely within the vertical bore of a guide tube until it strikes a specimen disposed at the lower open end of such tube. The bore is smooth and of slightly greater diameter than that of the drop hammer to avoid frictional contact, the main purpose of such arrangement being to provide for dropping the weight in such manner that it will not tumble or wobble during its fall, and will be confined to a definite position at the end of its fall.

Prior art devices have been used which permit a drop hammer to fall freely through open space, but such devices have various disadvantages. It is quite difficult to release a weight so that all parts of it become free simultaneously, and if any local area sticks to the release mechanism longer than the others the weight may tumble or wobble so much that it does not strike the specimen properly. The use of unguided weights also entails recovering the weight after termination of its fall, together with the risk of possible damage to other equipment or to the weight itself.

Such prior art devices have heretofore been improved by various guide systems. In one known device, the drop hammer is allowed to fall between a pair of columns which serves as guides. In still another, the hammer is allowed to fall through the bore of a tube. In both systems, the hammer is typically raised and released by an electromagnet.

Important features of the present invention are the slotting of a guide tube and the cooperative engagement between such guide tube slotting and a slidable weight raising and release mechanism. The principal slot is vertical and extends almost the whole height of the guide tube. Such slot has for one purpose preventing the free falling weight from compressing the air beneath it and thus providing a cushion which would result in an inaccurate calculation of the work done on the specimen (height from which weight is released multiplied by its weight). Even though the guide tube is preferably left open at its lower end, the falling weight may not push the air through such open end fast enough to avoid such cushioning.

Another purpose of the vertical slot is to permit interengagement between the weight within the bore of the guide tube and the weight raising and release mechanism (hereinafter called "release mechanism" for the sake of brevity) which is mounted on the tube so that it is both axially and circumferentially movable with respect thereto. Such release mechanism includes a weight engaging member or pin movable transversely of the bore so that in one position it securely engages the weight for common vertical movement therewith, and in another position is free of contact with the weight and permits it to fall freely.

The slotting of the guide tube also includes a multiplicity of slots extending circumferentially and horizontally from such main vertical slot. Such horizontal slots are preferably short in relation to the complete circumference of the guide tube, and have for their function defining accurately the heights from which the weight or drop hammer is released. Each vertical location of a horizontal slot has associated with it a dimension inscribed nearby on the outer surface of the guide tube, and a member of the release mechanism, preferably the same member engaging the weight, rests in such horizontal slot to form temporary static arrangement between weight, guide tube and release mechanism. In achieving this condition, the release mechanism is rotated around the guide tube, the pin rotating through the groove of the drop hammer.

The general description above will become more apparent from the following considered together with the drawing, in which:

FIGURE 1 is a perspective view of a preferred embodiment of the invention showing a test specimen in test position and the other components in the positions occupied just after the drop hammer has been released and impacted the specimen but has not broken it, FIGURE 2 is a partial perspective view of the same embodiment showing the top of the assembly, FIGURE 3 is a partial elevation of the guide tube of the same embodiment, partially in longitudinal cross section, FIGURE 4 is a transverse cross section of the same guide tube, on line 4—4 of FIGURE 3, FIGURE 5 is an elevation of the drop hammer of the same preferred embodiment, partially in longitudinal cross section, FIGURE 6 is a top plan view of the same drop hammer, and FIGURE 7 is a perspective view of the release mechanism of the same embodiment, partially broken away and partially in section to show details thereof.

As shown in FIGURE 1, the impact tester 1 comprises guide tube 2 vertically disposed above the specimen S mounted in specimen holder 3. Guide tube 2 is engaged by release mechanism 4 and is secured in position between upper guide support 5 and lower guide support 6, each end of the guide tube fitting into a countersunk portion (not shown) of a through hole in the adjacent support. The through portion of each support hole, 7 for upper support 5 as shown in FIGURE 2, is preferably of the same bore or larger than the bore 8 of the guide tube 2. This enables drop hammer 10 to fall from the lower end of the guide tube and the hole in lower support 6 to strike specimen S in operating the impact tester, while upper support hole 7 makes it possible to remove drop hammer 10 and replace it with a similar hammer of a different weight.

The above disposition of guide tube 2 and its supports 5 and 6 is secured by support rod 51 having shoulders not shown abutting the under side of upper guide support 5 and the upper side of lower guide support 6. Threaded portions of smaller diameter extend from each shoulder of rod 51 and through the indicated appropriate holes in the guide supports, the upper such portion 52 extending through upper support 5 and engaging a nut 53 which is tightened thereon to tighten support 5 against the upper shoulder of rod 51. The lower threaded extension of rod 51 passes through lower support 6 and threadedly engages a blind tapped hole in spacer block 55. Appropriate machine screws 56 extend through spacer block 55 and threadedly engage tapped holes in base plate 57, which may be secured to a bench by appropriate fasteners extending through mounting holes 58.

Specimen holder 3 is designed for mounting a specimen S in cantilever fashion beneath drop hammer 10, and consists of an L-shaped jaw 31 and a flat jaw 32 secured together with machine screws 33. The vertical leg 34 of jaw 31 contains an appropriate slot for the seating of specimen S, while its horizontal leg 35 contains appropriate openings for securing holder 3 to base plate 57 by additional screws 33.

The drop hammer 10 shown in FIGURES 5 and 6 consists of a body 11 of generally cylindrical shape terminating in a rounded or blunted lower end 12 and a hardened ball 13 pressed into a centrally formed socket in lower end 12 so that approximately half of the ball protrudes therefrom. A large hole 14 drilled from the upper surface of body 11 modifies the body from a solid cylinder to more or less of a cylindrical shell, thus allowing the drop hammer to have an axially elongated form, which form has been found to be less likely to cock and wobble than one in which the length and diameter are more nearly equal. The use of such a hole also makes it possible to accurately fabricate drop hammer 10 to a convenient weight, e.g., 0.50 pound, as the depth at which the hole is bottomed may be adjusted during fabrication. A smaller and coaxial hole 15 connects hole 14 with the socket for ball 13 for the insertion of a drift pin when the ball is to be removed and replaced. It should be noted that ball 13 takes all the wear and is the only part requiring replacement.

An annular groove 16 is formed in the outer surface of drop hammer 10, intermediate its ends and preferably as close as possible to the upper end. This groove 16 serves to receive the inner end of a pin 46 of release mechanism 4 when the latter is used in raising the drop hammer or holding it in position preliminary to a drop.

The release mechanism 4 comprises a ring member 41 adapted to be mounted in slidable relationship on guide tube 2, both axially and circumferentially, an open-ended flanged spring barrel 42 rigidly secured to ring 41 at its unflanged end and extending radially outwardly therefrom, a cover plate 43 secured to the flanged end 44 of the barrel, spring 45 disposed within the barrel, and a hand actuated pin 46 slidable within spring 45 and appropriate supporting openings in ring 41 and cover plate 43. Pin 46 has secured thereto for common movement a handle 47 and a flange or disc 48 used in compressing spring 45. In its relaxed position, spring 45 engages disc 48 to force rod 46 radially inwardly and into engagement with groove 16 of drop hammer 10, assuming registering positions. It should also be noted that ring 41 of the release mechanism has a window 49 on each side of its junction with spring barrel 42.

Guide tube 2 has a longitudinal opening or slot 21 through its wall 22 extending almost from one end to the other. Extending horizontally and circumferentially from vertical slot 21 are a series of longitudinally spaced right hand indexing slots 23 and a series of left hand indexing slots 24 similarly spaced from one another in the longitudinal (vertical) direction. Each series of slots is evenly spaced with the same spacing as for the other series, and one series is staggered with respect to the other so that the combination is a single group of evenly spaced slots with uniform increments of height in proceeding from one left hand slot 24 to the next higher right hand slot 23, then to the next higher left hand slot, etc. The widths of all slots are sufficient to permit ready movement of pin 46 of the release mechanism 4 therealong, and indexing slots 23 and 24 need extend circumferentially just enough to allow pin 46 to rest on the lower wall of the slot. Conveniently inscribed on the outer surface of guide tube 2 on the center line of each indexing slot is the height of the drop hammer 10 above specimen S when pin 46 extends through such slot into groove 16 of the drop hammer. As exemplified in FIGURE 3 of the drawing, when such registration is accomplished through lowermost slot 23, inscribed "0," the drop hammer is resting on the specimen, while registration through lowermost slot 24, inscribed ".2," means that the drop hammer has been raised and stopped 0.2 inch above the specimen. In FIGURE 1, the drop hammer has been dropped from 2.6 inches above the specimen, this figure also indicating how the height inscription is read through one of the windows 49 of ring 41. This registration of the height inscription with window 49 also serves as a guard against inadvertently releasing the drop hammer together with the release mechanism (down vertical slot 21), as the height can not be read until pin 46 is properly seated in an indexing slot.

The marking clip 27 shown in FIGURE 1 is simply a piece of spring metal slidable by hand on guide tube 2 to mark the height of the last drop.

In operation, one of several specimens of the same composition and history is mounted in specimen holder 3, preferably as a cantilever beam although other dispositions may be used, e.g., that of a simple beam. The drop hammer 10 is engaged by release mechanism 4 and is raised thereby to the 0.2 inch indexing slot and rotated to the left until the ".2" inscription is read through left hand window 49. Rotation is stopped, pin 46 being allowed to rest on the lower wall of the indexing slot 24, and the pin is pulled out to release the drop hammer. Assuming the specimen does not rupture, this process is repeated at the 0.4 inch height, etc., until the specimen is broken. Successive tests of the other specimens from the same group may then be started at heights only two or three increments below that at which the first specimen failed.

By way of example, an embodiment of the invention was constructed with a guide tube 2 having a bore of 1 inch and a drop hammer 10 having a diameter of $^{31}/_{32}$ inch. The maximum drop height was 50.0 inches, and drop hammers of 0.25, 0.50 and 1.00 pound were made and used. These three drop hammers had a common dimension between their lower ends 12 and grooves 16 to permit use of the same assembly, but it is apparent that other means could be used to accomplish the same results, e.g., different specimen slots in specimen holder 3 for different weights of drop hammer. Specimens were standardized at 1¾ inches long, square ¼ inch cross section, mounted with ⅞ inch of length in the holder and the other ⅞ inch overhanging. The specimen holder was disposed with respect to the guide tube so that the ball 13 of the test hammer strikes the specimen on its centerline ⅛ inch from its free end.

The apparatus described has been found particularly useful in testing tungsten carbide shapes and steel bonded to tungsten carbide.

Broadly, the present invention comprises an impact testing machine in which a drop hammer is disposed to fall freely and without appreciable friction within the bore of a guide tube having a novel slot system through its wall, such system including an elongated vertical slot and a multiplicity of horizontal slots branching off from the vertical slot to define a like number of drop positions having various heights above a reference plane. Each of the slots will receive a pin member extending generally radially through the wall and into a recess in the drop hammer for moving it vertically through the elongated slot and permitting movement of the pin into any of the horizontal slots. Also novel is the release mechanism itself, which as a whole is mounted on the guide tube so that it is axially and circumferentially but not radially slidable and movable thereon, and supports the pin member so that the pin at rest firmly engages the drop hammer and is radially retractable therefrom to permit a fall of the hammer.

It will be apparent that the particular embodiment shown in the drawing is capable of use in modes other than that described, and also that such structure may be modified in various ways without departing from the spirit of the present invention. As one instance, it is not imperative that the release mechanism shown be separated from the drop hammer when the latter is to be dropped, as the mechanism may simply be rotated by tapping it in the circumferential direction until it is in position to fall down the vertical slot. The added weight must, of course, be taken into consideration, and it may be necessary to make the vertical slot 21 somewhat deeper, as indicated by phantom bottom 25 or complete slot 26 of FIGURE 3, to insure that all of the kinetic energy of the falling body will be delivered to the specimen under test. Such a modus operandi is not preferred because it is likely to introduce undesired friction, in particular between the ring of the release mechanism and the periphery of the guide tube.

If the pin of the release mechanism is thus not to be retracted, a more practical construction is the elimination of all elements of the release mechanism except the pin itself, which may then be secured to the drop hammer by threading, welding, etc. Any slight cocking tendency may be avoided by modifying the otherwise cylindrical drop hammer to furnish a compensating counter-movement, but this is not strictly necessary. One method of compensating is to remove excess material from the region of the drop hammer where the pin is attached, another is to add weight to the opposite side. A more elaborate technique is to provide a second slot system and pin diametrically opposed to the first system and pin but otherwise identical. Such structure and method would have the advantage over those preferred in that the drop hammer with attached pins would be released from two opposed points of the guide tube simultaneously, avoiding the slight tendency to cock when release is from only one point, assuming that the precise machining required warrants the investment therein.

If the present invention is to be used in the manner first described, i.e., by retracting the pin from the drop hammer, it is apparent that the elongated slot in the guide tube need not be strictly vertical, so long as it has a vertical component. Likewise the pin-receiving recess in the drop hammer need not be annular, although this is most convenient for operation and for preserving the cylindrical symmetry of the drop hammer, but may, e.g., be one or more holes each capable of receiving the inner end of the pin and rotating as well as translating with the pin.

The specimen may be mounted in various locations with respect to the guide tube, even extending into an opening therein so that the portion below such opening serves as a receiver of broken specimens and the drop hammer as well.

In general, the preferred embodiment described is the simplest to fabricate, but it is to be understood that additional modifications too numerous to mention may be made without departing from the present invention. To mention only some, there is no necessity for having a cylindrical bore in the guide tube and a cylindrical drop hammer, as these may be square, triangular, hexagonal, etc. The only requirements are that the bore be vertical and of substantially uniform cross section from top to bottom and that the outer surface of the drop hammer be of conforming shape, both surfaces preferably being symmetrical about a vertical axis to provide uniform weight distribution in the drop hammer and a uniform clearance between surfaces. Another obvious modification is in the ring by which the release mechanism is slidably mounted on the guide tube; it is believed to be apparent that this ring need not extend full circle but merely need extend only slightly more than half circle, and that it may be replaced by equivalents, e.g., a small arcuate member extending less than a half circle together with a pair of strips secured parallel to and spaced from the outer surface of the guide tube to confine such member and disposed so that the movement of the pin into the horizontal slots is not hindered.

What is claimed is:

1. In a drop hammer impact tester, a release mechanism for raising, positioning and releasing a circumferentially slotted drop hammer which is free falling within a vertically disposed guide tube having an elongated generally vertical slot therethrough and a multiplicity of short circumferential indexing slots extending horizontally from said vertical slot, said release mechanism comprising a ring member having a hole therethrough and adapted to be slidably mounted on said guide tube for longitudinal and circumferential movements with respect thereto, a barrel member secured to the ring member, extending transversely therefrom and terminating in a plate having a hole therethrough in horizontal transverse alignment with said ring hole, and a pin member transversely slidable through said holes in the ring and plate and passing through the interior of said barrel member, the outer end of said pin projecting from said plate and the inner end being adaptable for passing through the vertical and horizontal slots in the guide tube and into the circumferential slot of said drop hammer, whereby said release mechanism may be used to raise and lower said drop hammer when the pin is extended through said vertical slot and into the drop hammer slot and may be rotated with said pin passing through any of the horizontal slots and into the drop hammer slot to bring said drop hammer to rest at a predetermined vertical position, and said pin may be retracted from the drop hammer slot to initiate a free fall of the hammer.

2. The release mechanism of claim 1 in which said guide tube has marked thereon at the same level as each horizontal slot the distance through which the hammer will fall before striking a specimen disposed at a predetermined spacing from the bottom end of the tube when the pin of the release mechanism passes through the same horizontal slot, and said ring has a window therethrough aligned with said marking and permitting it to be read when said pin is so engaged.

References Cited by the Examiner

UNITED STATES PATENTS

| 422,243 | 2/1890 | Moulton et al. | 73—429 |
|---|---|---|---|
| 2,341,270 | 2/1944 | Deam et al. | 73—12 |
| 2,590,486 | 3/1952 | Aubert | 73—79 |
| 3,058,224 | 10/1962 | Goodemote | 73—12 X |
| 3,106,834 | 10/1963 | Parstorfer | 73—12 |

FOREIGN PATENTS 448,091  11/1912  France.

RICHARD C. QUEISSSER, *Primary Examiner.*

L. MOK, J. J. SMITH, *Assistant Examiners.*